(12) United States Patent
Fujiwara

(10) Patent No.: US 8,696,502 B2
(45) Date of Patent: Apr. 15, 2014

(54) CHAIN TRANSMISSION MECHANISM

(75) Inventor: Makoto Fujiwara, Osaka (JP)

(73) Assignee: Tsubakimoto Chain Company, Osaka (JP)

( * ) Notice: Subject to any disclaimer, the term of this patent is extended or adjusted under 35 U.S.C. 154(b) by 246 days.

(21) Appl. No.: 13/156,377

(22) Filed: Jun. 9, 2011

(65) Prior Publication Data

US 2011/0306452 A1    Dec. 15, 2011

(30) Foreign Application Priority Data

Jun. 11, 2010  (JP) ................................. 2010-133884

(51) Int. Cl.
*F16H 7/18*  (2006.01)

(52) U.S. Cl.
USPC ......................................................... 474/156

(58) Field of Classification Search
USPC .......................................... 474/155, 156, 161
See application file for complete search history.

(56) References Cited

U.S. PATENT DOCUMENTS

| | | | | |
|---|---|---|---|---|
| 5,052,984 A * | 10/1991 | Shaffer | .......................... | 474/156 |
| 2007/0111833 A1 * | 5/2007 | Young | ........................... | 474/152 |
| 2009/0275434 A1 * | 11/2009 | Ritz et al. | ...................... | 474/155 |

FOREIGN PATENT DOCUMENTS

| | | |
|---|---|---|
| JP | 2002-523698 | 7/2003 |
| JP | 2011047023 A * | 3/2011 |
| WO | WO 00/11374 | 3/2000 |

OTHER PUBLICATIONS

English Machine Translation of JP 2011-47023 A.*

* cited by examiner

*Primary Examiner* — Michael Mansen
*Assistant Examiner* — Diem Tran
(74) *Attorney, Agent, or Firm* — Stephen H. Eland; Dann, Dorfman, Herrell & Skillman

(57) ABSTRACT

The invention provides a chain transmission mechanism capable of alleviating impact and impact noise caused when a chain engages and contacts with a sprocket, of not increasing the impact and impact noise even if the chain transmission mechanism is driven in heavy load and in high speed, of reducing vibrations, breakage, wear and others of the chain and the sprocket and of improving its durability. Tooth bottoms of the sprocket are formed so as not contact any pin, bush or drive roller when the chain is wound around the sprocket as guide rollers rotatably supported coaxially with a pin of the chain rolls on a track along the guide rail provided on the side of teeth of the sprocket. The invention provides a guide rail around the sprocket to engage the chain and lighten its impact with the sprocket as the mechanism operates.

19 Claims, 11 Drawing Sheets

CHAIN TRANSMISSION MECHANISM

CROSS REFERENCE TO RELATED APPLICATIONS

This application claims the foreign priority benefit under Title 35, United States Code, §119(a)-(d) of Japanese Patent Application No. 2010-133884, filed on Jun. 11, 2010 in the Japan Patent Office, the disclosure of which is herein incorporated by reference in its entirety.

BACKGROUND OF THE INVENTION

Field of the Invention

The present invention relates to a chain transmission mechanism having a chain in which pluralities of link plates are linked alternately by pins of connectors and a sprocket having a plurality of teeth that engage with pins, bushes or drive rollers of the chain and more specifically to a chain transmission mechanism suitably used in a conveyance assembly, such as a chain conveyor.

Hitherto, as shown in FIG. 8, while a chain transmission mechanism 500 in which a chain 530 is suspended around at least two sprockets of driving and driven sprockets 510 and 520 is widely used to transmit power, it is being desired to reduce its noise level in any of its usage.

Specifically, impact noise is generated when the chain 530 engages with the driving sprocket (and the driven sprocket 520), i.e., the noise generated when connectors (pins, bushes or drive rollers) 531 of the chain 510 contact with teeth 511 of the sprocket 510 is a major factor of the noise. It has been a problem to reduce this noise of the chain transmission mechanism.

Still more, impacts caused when the teeth of the sprocket contact with the connectors (pins, bushes or drive rollers) become not only a cause of vibrations but also a cause of breakage and wear of the chain and the sprocket, thus posing a problem that it reduces durability of the chain transmission mechanism.

Although it is possible to reduce the impact and impact noise, as shown in FIG. 9, by designing an inclined surface 513 of the tooth 511 of the sprocket 510 so that its angle of contact in contacting with the connectors 531 (pins, bushes or drive rollers) becomes small when the teeth 511 contact them, an angle of contact in contacting with a tooth bottom 512 is large and hence it is difficult to reduce the impact and impact noise.

It is required to limit load and speed to alleviate such impact and impact noise generated when the chain engages and contacts with the sprocket and to improve the durability of the chain transmission mechanism.

There is also known a sprocket which is provided with cushion rings whose outer peripheral surfaces contact with link plates of a chain and which is made of a resilient member on the both sides of the sprocket. The cushion ring is adapted so that the link plate contacts with the outer peripheral surface of the cushion ring just before when a connector of the chain contacts with the tooth of the sprocket to alleviate impact and impact noise during engagement as disclosed in Published Japanese Patent Application No. 2002-523698, for example.

Because the cushion ring of the known sprocket repeats compressive deformation caused by the engagement with each link plate of the chain and return release caused by disengagement when it is rotated by the chain being suspended around it, the cushion ring deforms repeatedly and is prone to cause local deterioration. Then, there is a problem that the cushion ring might be torn and produce fractures, seriously affecting the chain transmission mechanism to which such sprocket is applied.

Still more, the cushion ring is largely and repeatedly deformed in high speed, is severely deteriorated and is very likely to cause tearing or fractures when the sprocket is rotated in heavy load and in high speed. Accordingly, there is a problem that the load and speed must still be limited from the aspect of the durability of the chain transmission mechanism.

SUMMARY OF THE INVENTION

Accordingly, the present invention aims at solving the aforementioned prior art problems by providing a chain transmission mechanism capable of alleviating impact and impact noise caused when a chain engages and contacts with a sprocket, of not increasing the impact and impact noise even if the chain transmission mechanism is driven in heavy load and in high speed, of reducing vibrations, breakage, wear and others of the chain and the sprocket and of improving its durability.

In order to solve the aforementioned problems, according to a first aspect of the invention, there is provided a chain transmission mechanism having a chain in which pluralities of link plates are alternately linked by connectors and at least one sprocket having a plurality of teeth engaging with either the bushes or drive rollers of the connectors of the chain, wherein the chain has guide rollers rotatably supported coaxially with the pins, the chain transmission mechanism further includes guide rails that in curved tracks around the sprockets limit a track of the chain by contacting with the guide rollers alongside of teeth of the sprocket and tooth bottoms of the sprocket are formed into a shape not contacting with the connectors of the chain when the chain is wound around the sprockets along the curved tracks of the guide rail.

According to a second aspect of the invention, the guide rail is provided so as to extend continuously in a tension section of the chain between the sprockets.

According to a third aspect of the invention, a pitch of the plurality of teeth of the sprocket within the curved track along the guide rail is arranged to be shorter than a pitch of the connectors of the chain.

According to a fourth aspect of the invention, a circumference of the pitch circle of the chain when the chain travels along the curved tracks of the guide rail has a diameter larger than that of a circumference of the pitch circle of the chain when the chain would engage with the sprocket without having the guide rail and the circumference of the pitch circle of the chain when the chain travels along the guide rail is arranged so as not to be positioned closer to the center than the circumference of the pitch circle of the chain that would occur if the chain were to engage with the sprocket without having the guide rail.

According to a fifth aspect of the invention, the chain has two link plate rows each composed of inner and outer link plates, drive rollers are located inside between the two link plate rows and engage with the teeth of the sprocket and the guide rollers are provided outside of the two link plate rows, respectively.

According to a sixth aspect of the invention, the chain has four link plate rows each composed of inner and outer link plates, the connector located inside between the respective center two link plate rows of the four link plate rows engages with the teeth of the sprocket and the guide rollers are provided inside of the two outer link plate rows of the four link plate rows, respectively.

According to a seventh aspect of the invention, the chain has two link plate rows each composed of inner and outer link plates, a guide roller is provided inside between the two link plate rows, the connector includes two drive rollers outside of the two link plate rows, respectively, and two rows of teeth of the sprocket are provided in the width direction corresponding to the drive rollers of the chain.

According to an eighth aspect of the invention, a guide rail is provided in the return section of the chain.

Advantageous Effects of the Invention

According to the first aspect of the chain transmission mechanism of the invention, because the chain transmission mechanism has the chain in which the pluralities of link plates are alternately linked by connectors and at least one sprocket having the plurality of teeth engaging with connectors of the chain, the chain has the guide rollers rotatably supported coaxially with the connector, the chain transmission mechanism further includes the guide rails that limit the track of the chain by contacting with the guide rollers on the sides of teeth of the sprocket and the tooth bottoms of the sprocket are formed into the shape not contacting with the connectors of the chain when the chain is wound around the sprockets along the track of the guide rail, the connectors of the chain contact only with inclined surfaces of the teeth having a small contact angle and do not contact with the tooth bottoms having a large contact angle when the chain is wound around the sprocket. Accordingly, it becomes possible to alleviate impact and impact noise caused during their contact.

Still more, the impact and impact noise do not increase even if the chain is driven in heavy load and in high speed. Vibrations, breakage, wear and others of the chain and the sprocket caused by the impact may be also reduced and durability of the whole chain transmission mechanism can be improved.

Furthermore, when the chain transmission mechanism is used in a chain conveyor or the like having rollers for bearing weight of articles to be conveyed, such rollers may be utilized as the guide rollers of the invention. Accordingly, it is not necessary to add any new component to the chain.

According to the second aspect of the chain transmission mechanism of the invention, because the guide rail is provided so as to extend continuously in the tension section of the chain, the chain is wound around the sprocket in a state in which the guide rollers roll on the guide rail. Accordingly, the guide rollers do not hit against the guide rail and generate no impact and impact noise when the chain is wound around the sprocket. Thus, it is possible to alleviate the impact and impact noise otherwise generated in engaging with the chain more effectively.

Furthermore, when the chain transmission mechanism is used in the chain conveyor or the like, the guide rail in the tension section may applied as a rail on which the guide rollers roll to bear the weight of articles to be conveyed and it is not necessary to add any new component.

According to the third aspect of the chain transmission mechanism of the invention, because the pitch of the plurality of teeth of the sprocket in the track along the guide rail is arranged to be shorter than the pitch of the connectors of the chain, i.e., a diameter of a pitch circle when the chain travels on the track along the guide rail is larger than a diameter of a pitch circle of the chain when the chain engages a sprocket without having the guide rail, the connectors of the chain do not move in the outer peripheral direction of the sprocket in the section in which the chain engages with the sprocket. Accordingly, the guide rollers do not disengage from the guide rail and it is possible to reduce the impact and impact noise otherwise generated due to disengagement and re-contact. Thus, it is possible to reduce the vibrations, breakage, wear and others of the whole chain transmission mechanism further and to improve the durability thereof.

According to the fourth aspect of the chain transmission mechanism of the invention, because the circumference of the pitch circle of the chain when the chain travels along the guide rail has the diameter larger than that of the circumference of the pitch circle of the chain when the chain engages with the sprocket without having the guide rail and the circumference of the pitch circle of the chain when the chain travels along the guide rail is arranged so as not to be positioned closer to the center than the circumference of the pitch circle of the chain when the chain engages with the sprocket without having the guide rail, it becomes possible to keep the point of contact of the connectors of the chain with the teeth of the sprocket steadily at the position separated from the tooth bottom in the section where the chain engages with the sprocket. Accordingly, it becomes possible to alleviate the impact and impact noise during the contact further.

According to the fifth through seventh aspects of the chain transmission mechanism of the invention, the chain transmission mechanism may be used in various uses corresponding to load and speed. When the chain transmission mechanism is used in a chain conveyor in particular, it becomes possible to reduce the impact and impact noise otherwise generated even if the chain transmission mechanism is used in heavy load and in high speed. Thus, it is possible to reduce the vibrations, breakage, wear and others of the whole chain transmission mechanism further and to improve the durability thereof.

According to the eighth aspect of the chain transmission mechanism of the invention, because the guide rail is provided in the chain return section, it is possible to limit the track of the chain by the guide rail in the return section in which the chain is prone to slack and to prevent flapping of the chain in the return section. Thus, it is possible to reduce the vibrations, breakage, wear and others of the whole chain transmission mechanism further and to improve the durability thereof.

BEST MODE FOR CARRYING OUT THE INVENTION

First Embodiment

Figure 1:
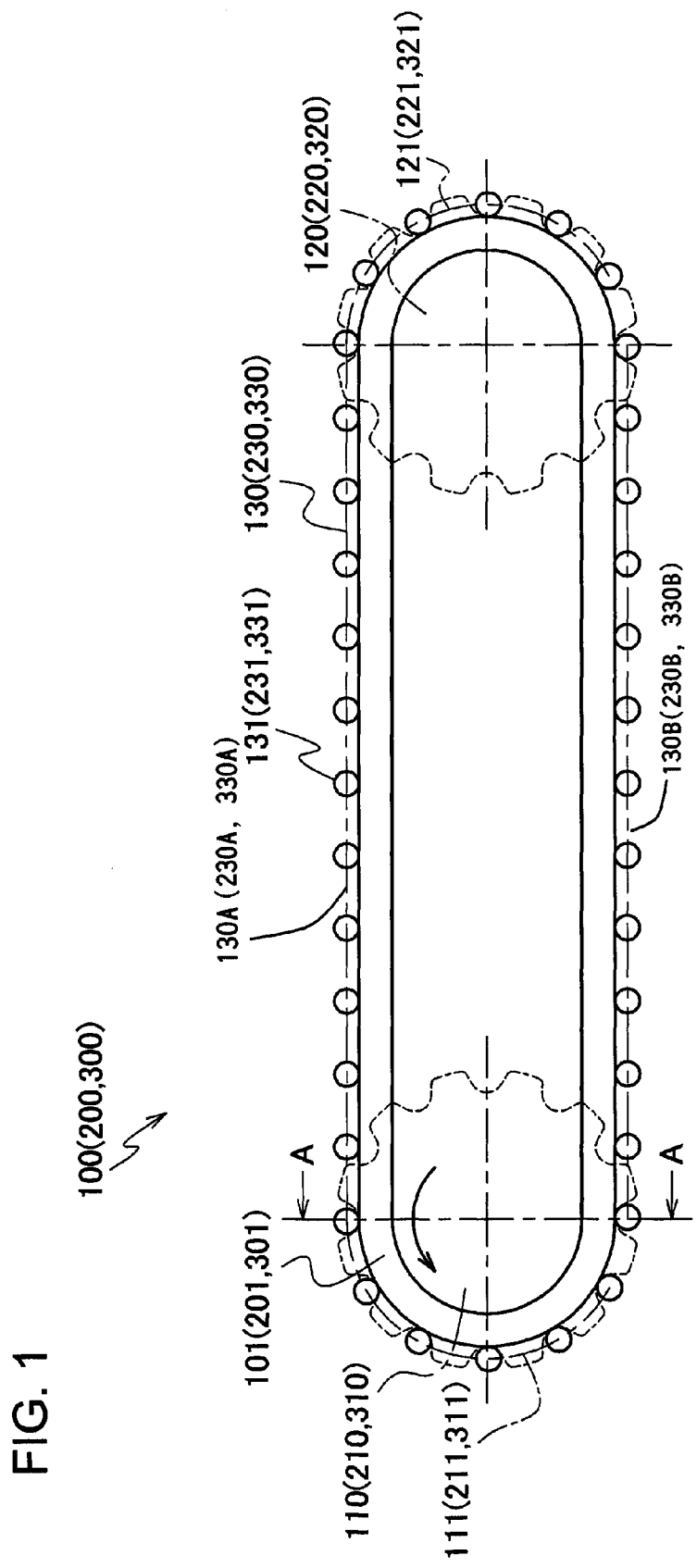
FIG. 1 is a side view of a chain transmission mechanism of the invention.
Figure 2A:
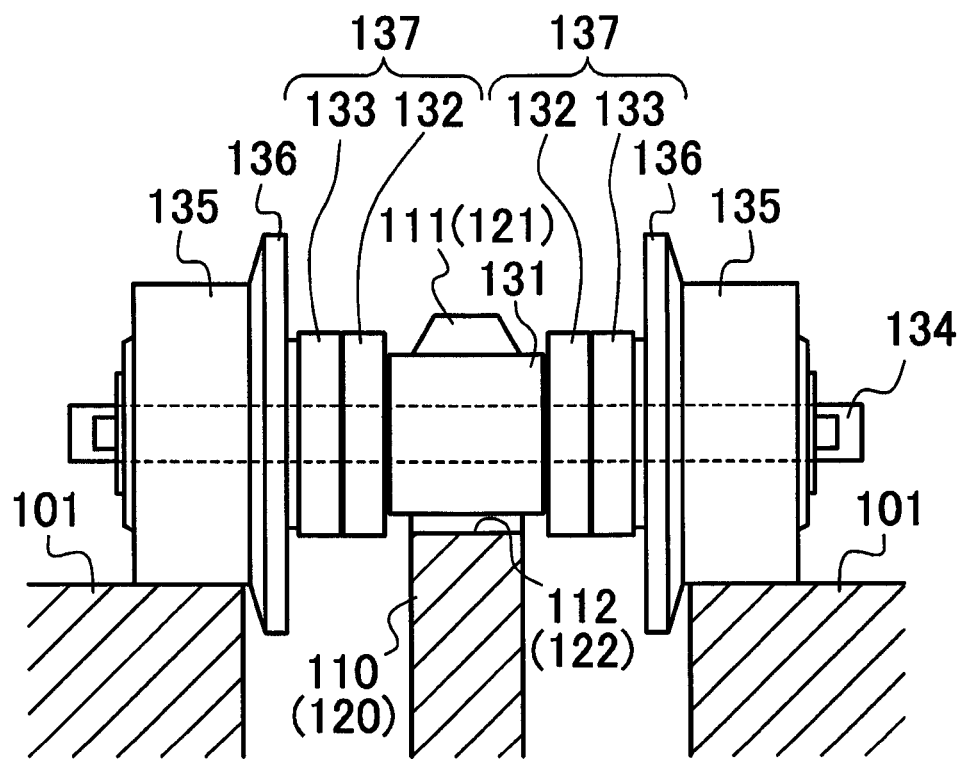
FIG. 2A is a section view taken along a line A-A of the first embodiment of the chain transmission mechanism shown in FIG. 1, in which the connector includes a drive roller.
Figure 2B:
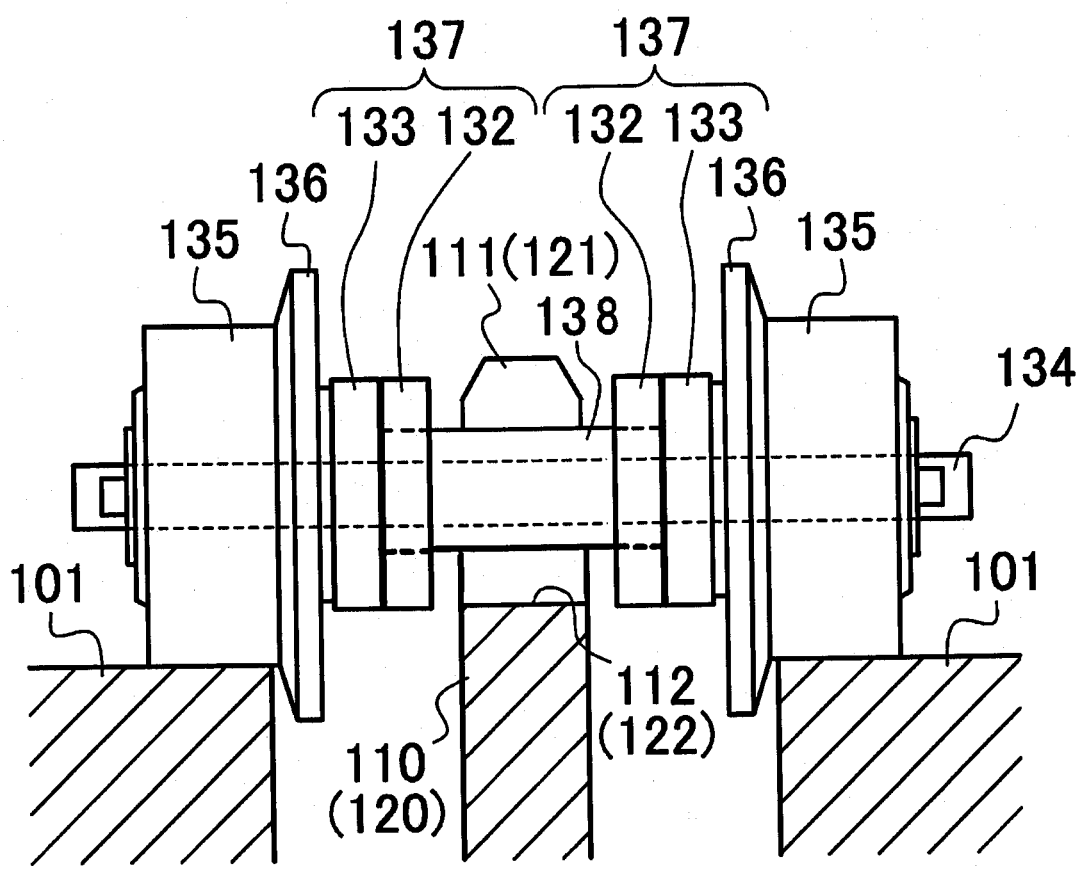
FIG. 2B is a section view taken along a line A-A of the first embodiment of the chain transmission mechanism shown in FIG. 1, in which the connector includes a bush.
Figure 3:
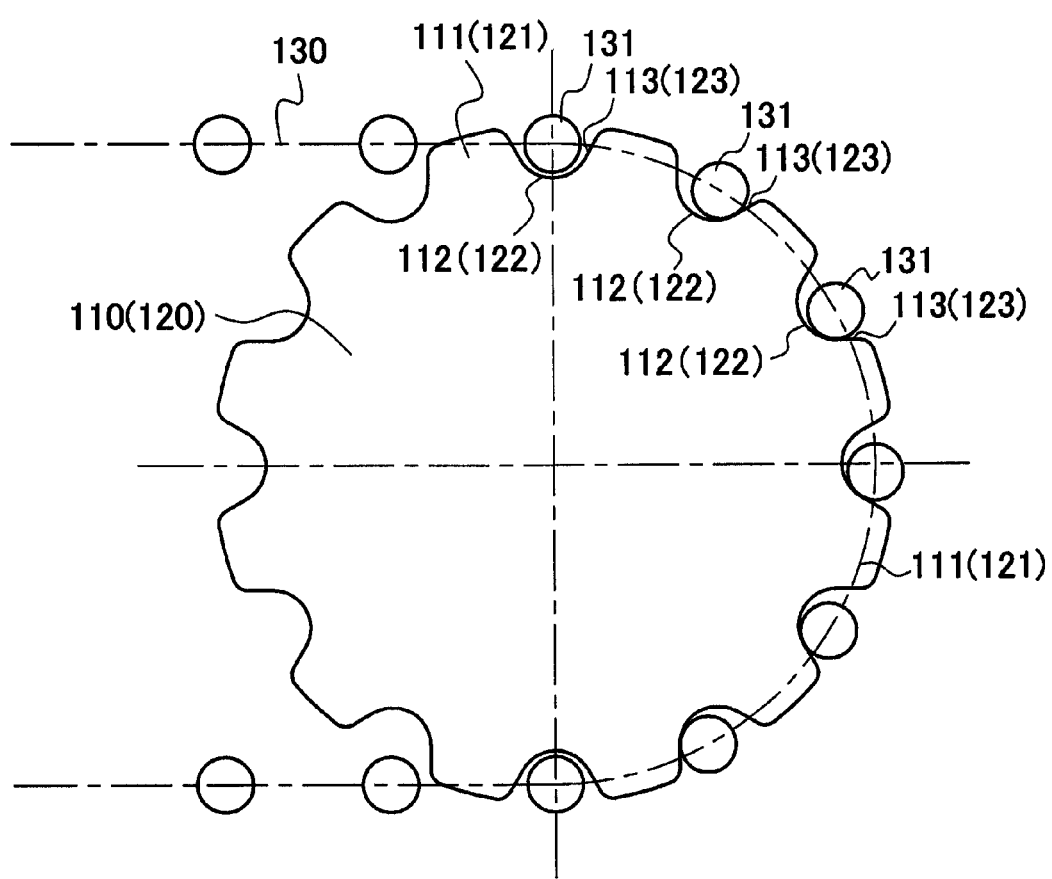
FIG. 3 is a partially enlarged explanatory diagram of the chain transmission mechanism shown in FIG. 1.

As shown in FIGS. 1 through 3, a first embodiment of a chain transmission mechanism 100 of the invention has a chain 130 suspended around driving and driven sprockets 110 and 120 respectively having a plurality of teeth 111 and 121 on the circumferential surfaces thereof and guide rails 101 provided on the both sides of tension-side and return-side traveling sections of the driving sprocket 110, the driven sprocket 120 and the chain 130. The tension run of the chain is designated 130A and the return run is designated 130B.

As shown in FIGS. 2A, and 2B the chain 130 has two rows of link plate rows 137 each composed of inner and outer link plates 132 and 133. The inner and outer link plates 132 and 133 of the two link plate rows 137 are connected alternately and flexibly by connectors 134.

As shown in FIG. 2A, drive roller 131 is rotatably provided on the pin 134 inside between the respective two link plate rows 137 and is adapted to engage with the teeth 111 and 121 of the driving and driven sprockets 110 and 120. In FIG. 2B, bushes 138 are provided to engage the teeth 111 and 121.

Guide rollers 135 are also provided on the both outer sides of the two link plate rows 137 rotatably with respect to the connector 134 so as to roll on the guide rails 101 provided on both sides of the teeth 111 and 121 of the driving and driven sprockets 110 and 120 and of tension-side and return-side traveling sections of the chain 130.

The track of the chain 130 is determined by the guide roller 135 rolls on the guide rail 101 as shown in FIGS. 2 and 3 when the chain 130 is wound around the driving sprocket 110 or the driven sprocket 120.

Tooth bottoms 112 and 122 of the teeth 111 and 121 of the driving and driven sprockets 110 and 120 are formed into a shape not contacting with the drive roller 131 of the chain 130 in the state in which the track of the chain 130 is determined by the guide roller 135.

This arrangement permits the drive roller 131 of the chain 130 to start to contact with inclined surfaces 113 and 123 of the teeth 111 and 121 with small angles with very small impacts when the chain 130 is wound around the driving and driven sprockets 110 and 120. The drive roller 131 of the chain 130 does not contact with the tooth bottoms 112 and 122 where an angle of contact is large, so that it is possible to alleviate the impact and impact noise caused during their contact.

The guide rail 101 is continuous in the tension section between the driving and driven sprockets 110 and 120 as shown in FIG. 1, so that it is possible to prevent impact and impact noise from being generated by the guide roller 135 hitting against the guide rail 101 when the chain is wound around the sprockets. Then, when the chain is used in a chain conveyor or the like, it is possible to bear weight of articles to be conveyed by the guide roller 135 rolling on the guide rail 101 provided in the tension section.

The pitch of the plurality of teeth 111 and 121 of the driving and driven sprockets 110 and 120 at the position where the chain 130 travels along the track of the guide rail 101 is smaller than a pitch of the connectors 134 of the chain 130 as it travels along the curved tracks of the guide rails.

Figure 4:
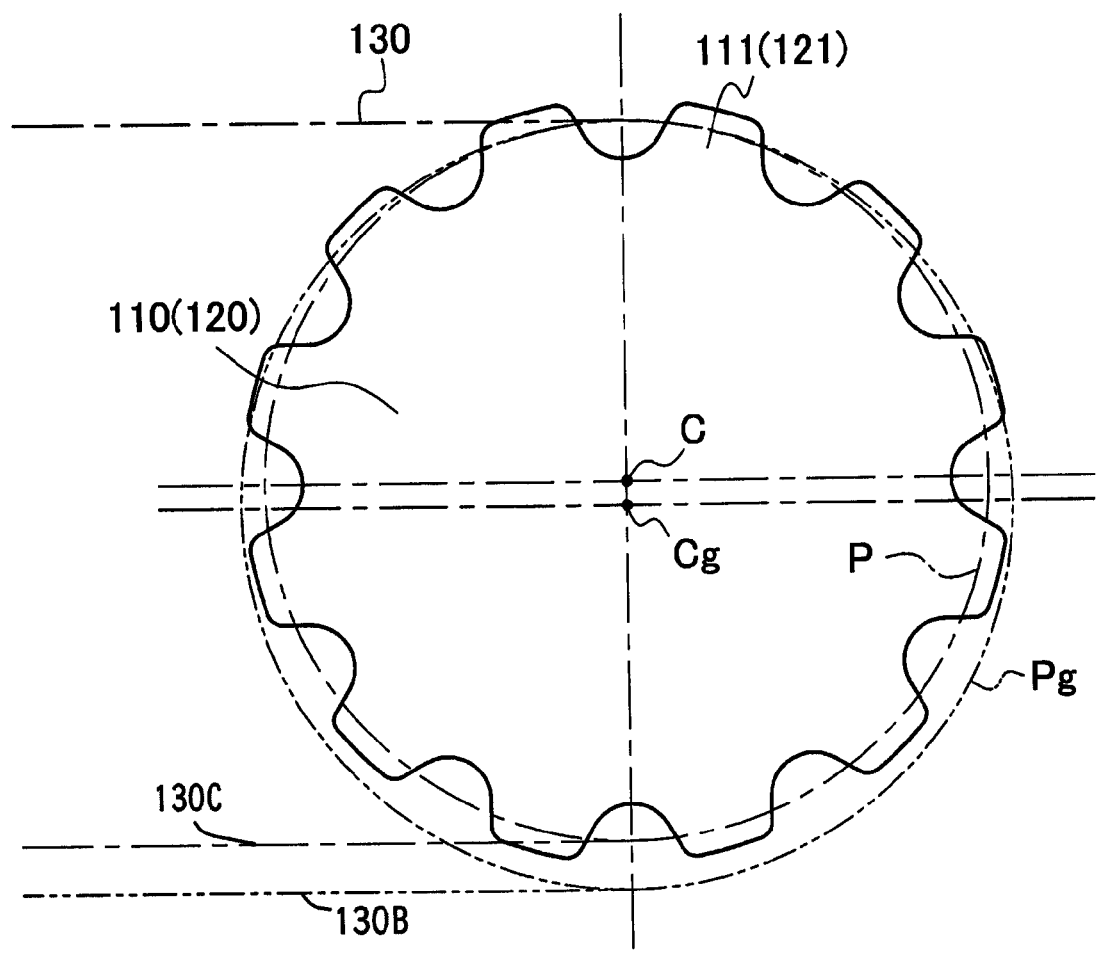
FIG. 4 is an explanatory diagram of a pitch circle of the chain transmission mechanism shown in FIG. 1.

That is, as shown in FIG. 4, the diameter of the circumference Pg of a pitch circle when the chain 130 travels the track along the guide rail 101 is arranged to be larger than the diameter of the circumference P of a pitch circle of the chain 130 if the chain 130 were to engage with the driving and driven sprockets 110 and 120 in a state having no guide rail 101. In this figure, 130B identifies the return run of the chain when it is determined by the curved track of the guide rail 101, and 130C identifies the return run of the chain in the absence of a guide rail 101.

Thereby, the drive roller 131 does not move in an outer peripheral direction of the sprocket in the section in which the chain 130 engages with the driving and driven sprockets 110 and 120, so that the guide roller 135 will not disengage from the guide rail 101 and it becomes possible to reduce the impact and impact noise otherwise caused by the disengagement and re-contact.

Still more, as shown in FIG. 4, the center Cg of the pitch circle Pg of the chain 130 when the chain 130 travels along the curved tracks of the guide rail 101 is designed to be offset from a center C of the driving and driven sprockets 110 and 120 so that the circumference Pg of the pitch circle of the chain 130 in traveling along the curved tracks of the guide rail 101 in a section (the right semi-circumferential section of the sprocket shown in FIG. 4) where the chain 130 engages with the driving and driven sprockets 110 and 120 is not positioned closer to the center more than the circumference P of the pitch circle of the chain 130 when the chain 130 engages with the driving and driven sprockets 110 and 120 in the state having no guide rail 101.

The circumference Pg of the pitch circle of the chain 130 in traveling along the guide rail 101 is designed so that it comes in contact with the circumference P of the pitch circle of the chain 130 when the chain 130 engages with the driving sprocket 110 and the chain 130 in the state having no guide rail 101 in the vicinity (upper point in FIG. 4) of an engagement starting or ending point of the tension section of the chain 130 and so that the circumference Pg of the pitch circle of the chain 130 traveling along the guide rail 101 is positioned always outside in sections other than that section in the present embodiment.

This arrangement allows the point of contact of the drive roller 131 of the chain 130 with the teeth 111 and 121 of the driving and driven sprockets 110 and 120 to be kept at the position steadily separated from the tooth bottom in the section where the chain 130 engages with the driving and driven sprockets 110 and 120, so that it is possible to alleviate the impact and impact noise further during their contact.

It is noted that because the guide rollers 135 provided on the both outer sides of the two link plate rows 137 have flanges, respectively, and widthwise moves of the chain 130 are restricted in the present embodiment, it is also possible to prevent the impact and impact noise from being otherwise generated by the inner link plate 132 contacting with the teeth 111 and 121 of the driving and driven sprockets 110 and 120.

Second Embodiment

A chain transmission mechanism 200 of a second embodiment of the invention is the same as the first embodiment, except for the chain 230.

Figure 5A:
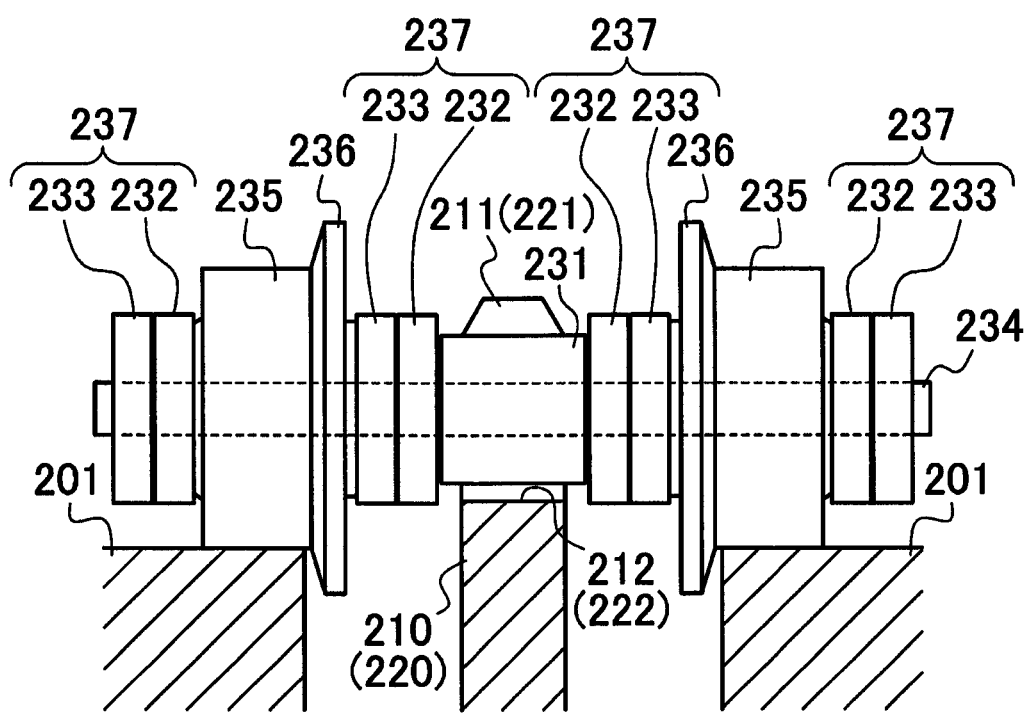
FIG. 5A is a section view similar to FIG. 2A of a chain transmission mechanism of a second embodiment of the invention in which the connector includes a drive roller.
Figure 5B:
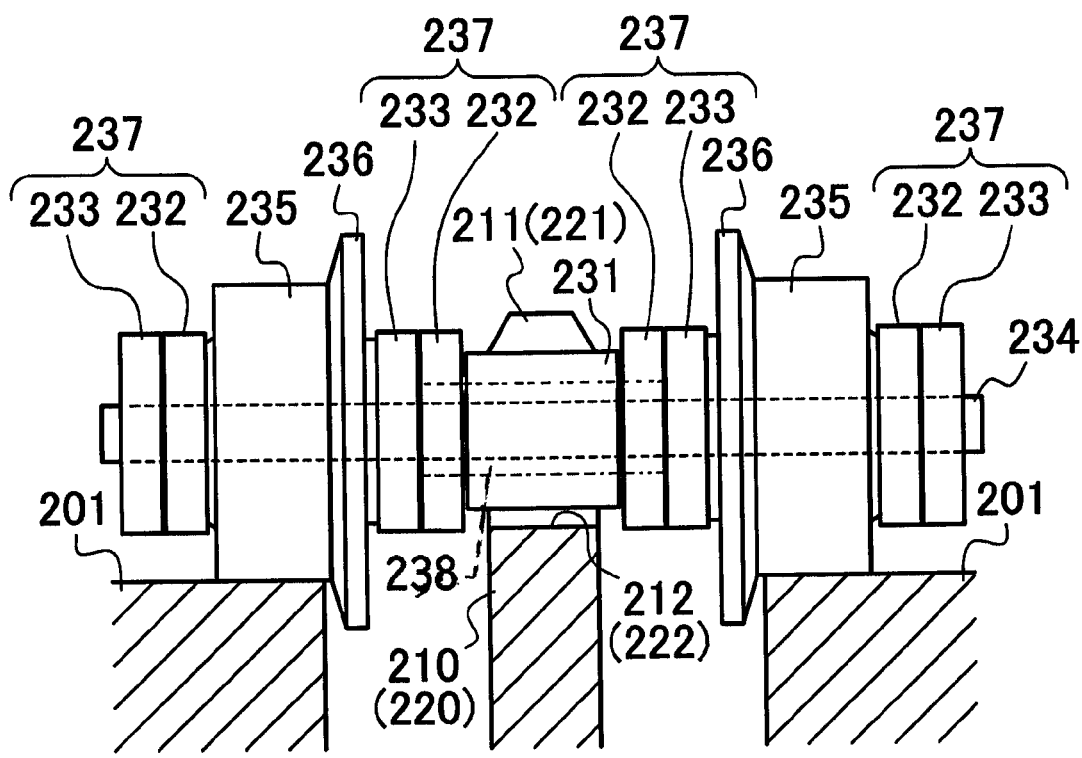
FIG. 5B is a section view similar to FIG. 5A of a chain transmission mechanism of a modified second embodiment of the invention in which the connector includes bush and drive roller.

As shown in FIG. 5A, the chain 230 has four rows of link plate rows 237 each composed of inner and outer link plates 232 and 233. The four link plate rows 237 are connected so that the inner and outer link plates 232 and 233 are alternately and flexibly connected. In FIG. 5B, bushes 138 are provided between the pins 234 and the rollers 231.

A drive roller 231 is rotatably provided inside between respective two center rows of the four link plate rows 237 so as to engage with teeth 211 and 221 of driving and driven sprockets 210 and 220.

Guide rollers 235 are provided inside of the respective outer two link plate rows 237 of the four link plate rows 237 rotatably with respect to a connector 234. The guide rollers 235 are arranged so as to roll on guide rails 201 provided on the both sides of the tension-side and return-side traveling section of teeth 211 of the driving sprocket 210, teeth 221 of the driven sprocket 220 and the chain 230.

Because the chain 230 has the four link plate rows 237, tensile strength of the chain 230 increases in addition to the action of the first embodiment and the chain 230 can be driven in high speed even if a load is heavier.

It is noted the tensile strength of the chain 230 can be improved further by juxtaposing a plurality of link plate rows 237 further.

Third Embodiment

Next, a third embodiment of the chain transmission mechanism of the invention will be explained.

Figure 6:
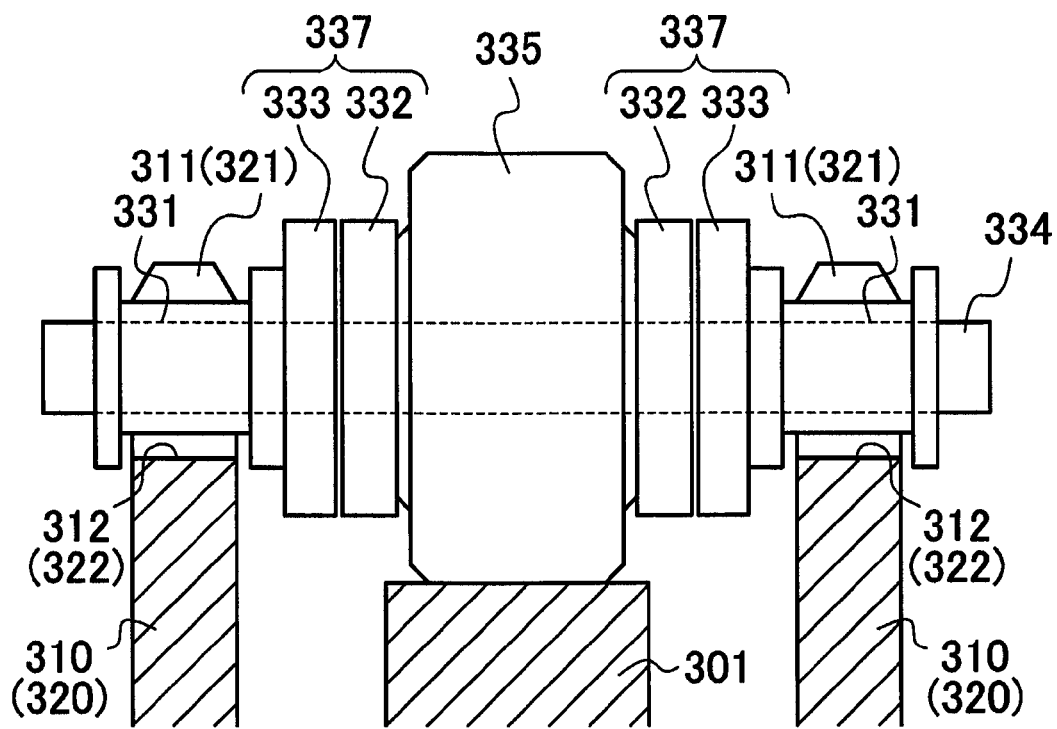
FIG. 6 is a section view similar to FIG. 2 of a chain transmission mechanism of a third embodiment of the invention shown in FIG. 1.
Figure 7:
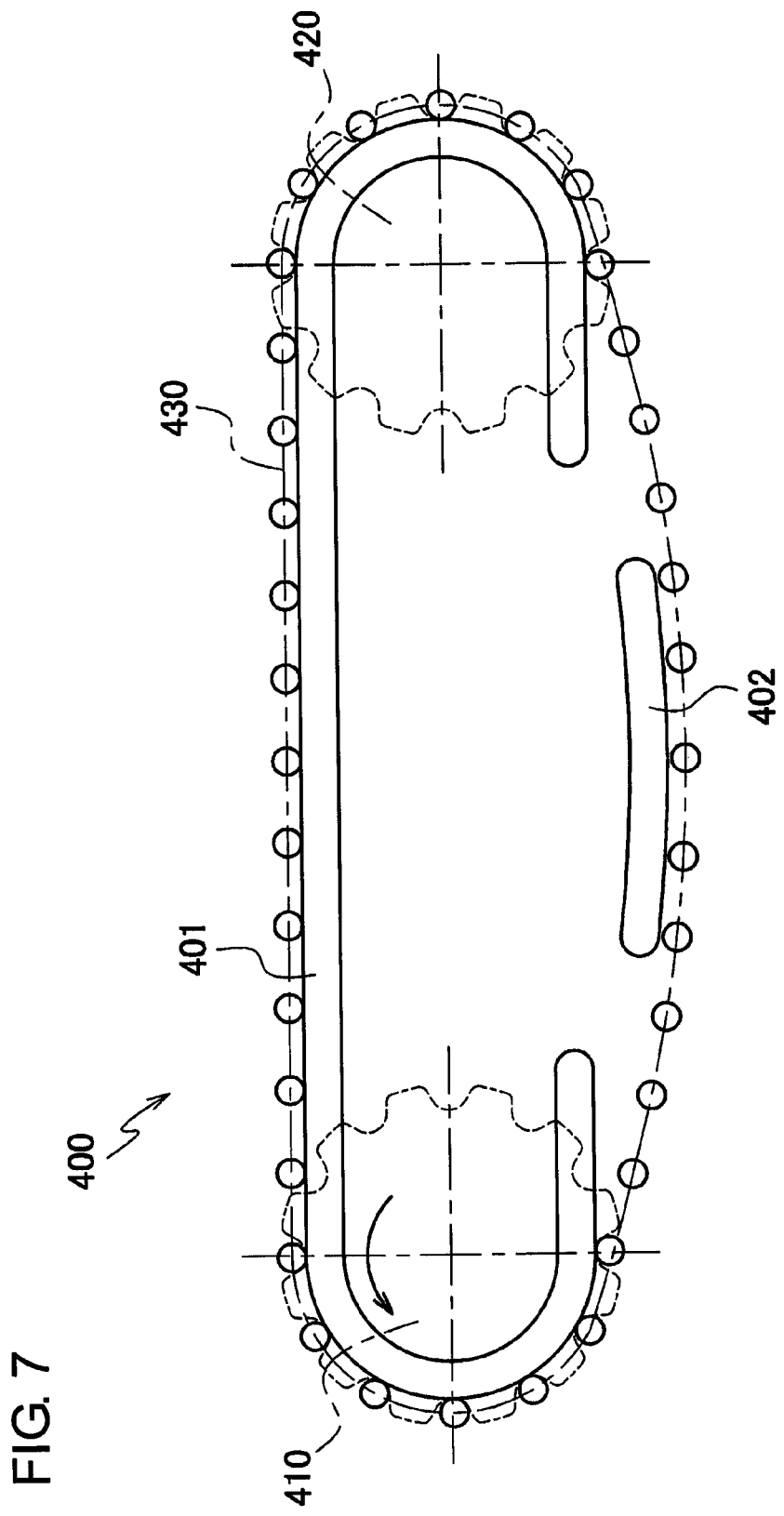
FIG. 7 is a side view similar to FIG. 1 showing another example of a disposition of a guide rail of the chain transmission mechanism of the invention.
Figure 8:
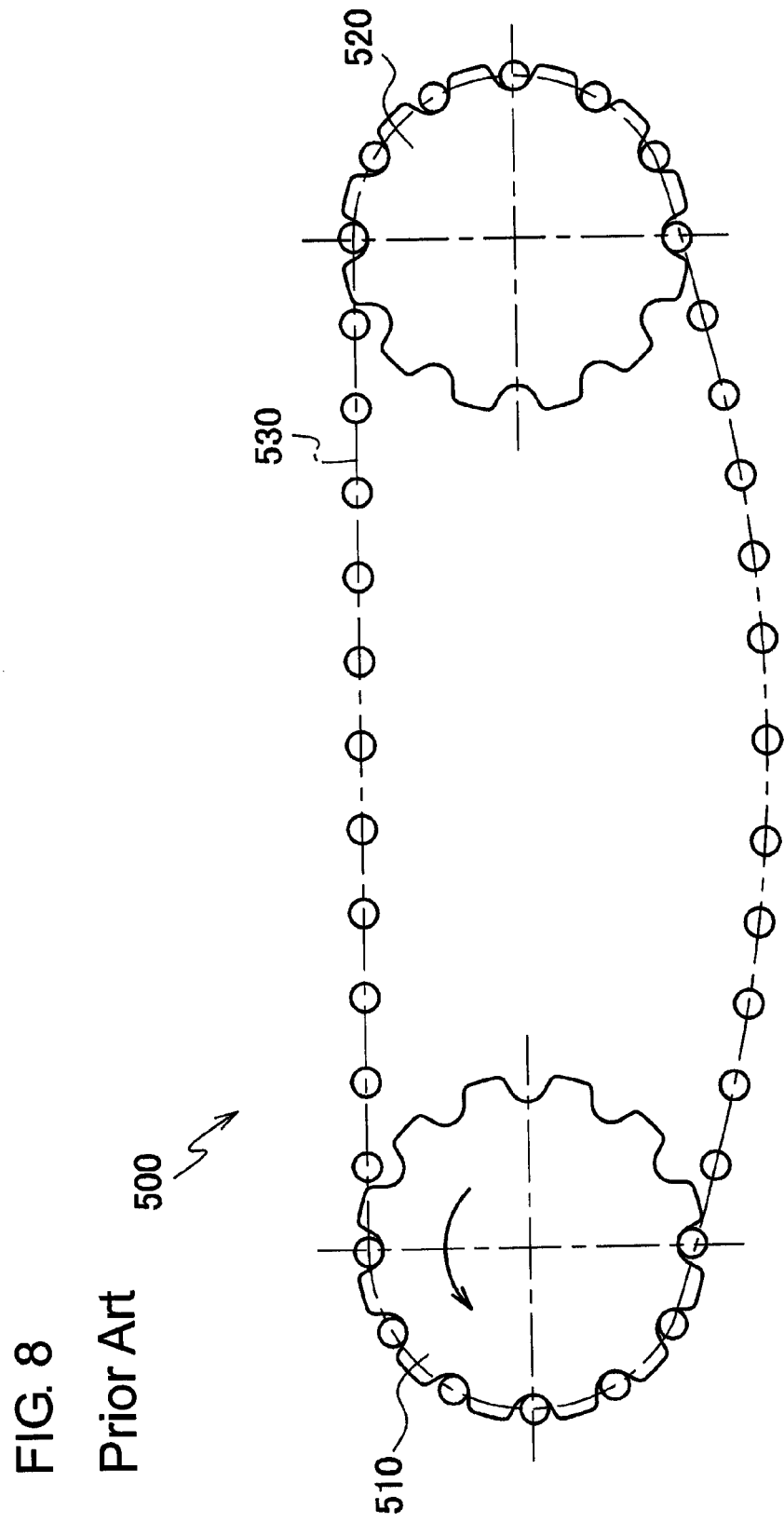
FIG. 8 is a side view of a prior art chain transmission mechanism.
Figure 9:
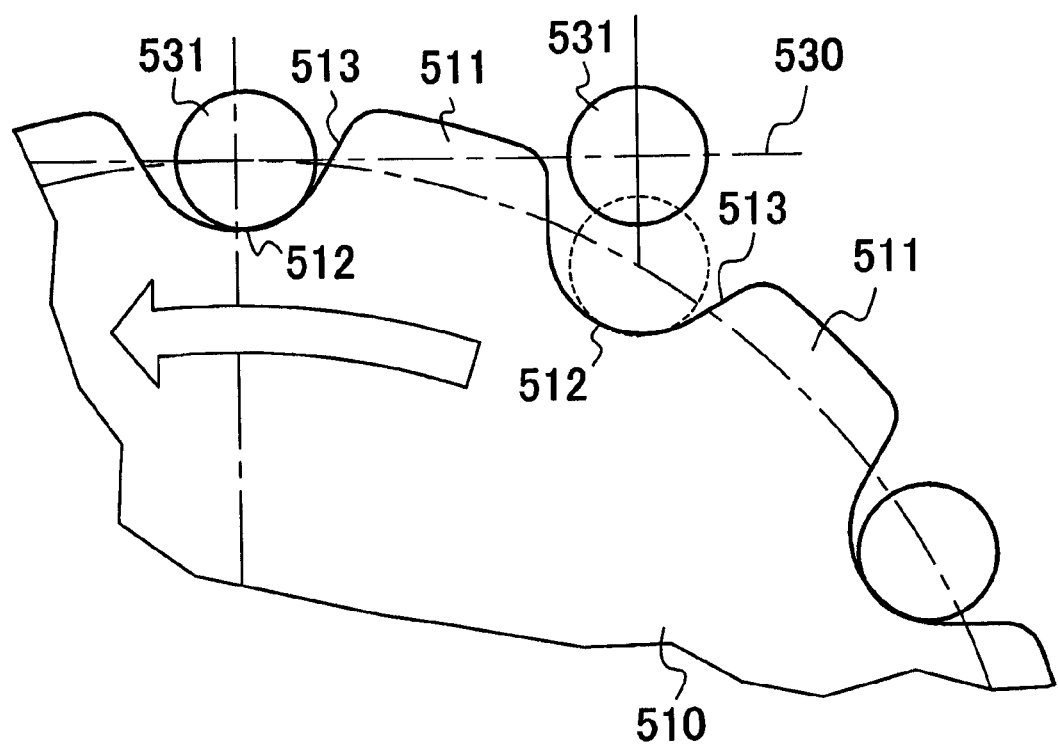
FIG. 9 is a partially enlarged explanatory diagram of the prior art chain transmission mechanism.

As shown in FIG. 6, a chain 330 of the chain transmission mechanism 300 of the third embodiment of the invention has two link plate rows 337 each composed of inner and outer link plates 332 and 333. The inner and outer link plates 332 and 333 of the two link plate rows 337 are alternately and flexibly connected by connectors 334, respectively.

A guide roller 335 is provided inside between the respective center two link plate rows 337 rotatably with respect to the connector 334. The guide roller 335 is arranged so as to roll on guide rails 301 provided between a pair of teeth 311 of the driving sprocket 310 and between a pair of teeth 321 of the driven sprocket 320 and under the chain 330 in the tension-side and return-side traveling section of the chain 330.

Drive rollers 331 are also provided rotatably on the outsides of the two link plate rows 337, respectively, so as to engage with the teeth 311 and 321 of the driving and driven sprockets 310 and 320, respectively.

The driving and driven sprockets 310 and 320 have the teeth 311 and 321 at the position corresponding to the drive rollers 331 of the chain 330 in parallel in the width direction, respectively.

It is noted that the driving and driven sprockets 310 and 320 may be what has only one outer peripheral portion including the teeth 311 and 321 in parallel by one sprocket or may be what two sprockets are provided in parallel.

This arrangement allows large power to be transmitted between the chain 330 and the driving sprocket 310 and the driven sprocket 320, so that the chain transmission mechanism may be driven in high speed even if a heavy load is applied thereto.

Still more, the contact force with the drive rollers 331 during the contact is dispersed to the two paralleling teeth 311 and 321, provided that the load is equal, so that it is possible to alleviate the impact and impact noise during their contact further.

It is noted that although the lengthy bar-like member is extended in the chain traveling direction as the guide rail 101 (201 and 301) as shown in FIG. 1 in the first through third embodiments, the guide rail may be a plate-like member on which the guide roller 135 (235 and 335) rolls on its end surface as a rolling surface.

Still more, although the guide rail 101 (201 and 301) is provided along the entire traveling track of the chain 130 (230 and 330), it may be provided at any part as long as it is provided on the underside of the teeth 111 (211, 311) at least at the part around which the chain 130 (230, 330) is wound.

For instance, when the chain transmission mechanism of the invention is used as a chain conveyor for example, a guide rail 401 may be provided continuously and integrally from the sides of the teeth 411 and 422 of the driving and driven sprockets 410 and 420 in the tension-side section in which articles to be conveyed are placed and the return-side guide rail 402 may be provided at the position corresponding to a slack near the middle of the chain in the return section where the slack is prone to be generated.

Thereby, it is possible to prevent flapping of the chain 430 in the return section, to reduce vibrations, breakage, wear and others of the whole chain transmission mechanism 400 and to improve the durability thereof.

As described above, according to the chain transmission mechanism of the invention, it is possible to alleviate the impact and impact noise caused by the contact when the chain engages with the sprocket, not to increase the impact and impact noise even if the chain transmission mechanism is driven in heavy load and in high speed, to reduce the vibrations, breakage, wear and others of the chain and the sprocket and to improve the durability thereof. Thus, the chain transmission mechanism of the invention has the advantageous effects. It is noted that sizes, scales, existence of clearance and the like are exaggerated or eliminated in contrast to the actual structures for the purpose of explanation in each drawing used in the explanation above.

The specific mode of the chain transmission mechanism of the invention may be any mode as long as the chain transmission mechanism has the chain in which the plurality of link plates is alternately linked by connectors and at least one sprocket having the plurality of teeth engaging with connectors, bushes or drive rollers of the chain, the chain has the guide rollers rotatably supported coaxially with the connectors, the chain transmission mechanism further includes the guide rails that determine the track of the chain by contacting with the guide rollers on the sides of teeth of the sprocket. The tooth bottoms of the sprocket are formed into the shape not contacting with the connectors, of the chain when the chain is wound around the sprockets along the curved track of the guide rail. Thus, the chain transmission mechanism alleviates the impact and impact noise caused by the contact when the chain engages with the sprocket, does not increase the impact and impact noise even if the chain is driven in heavy load and high speed and improves durability thereof.

The chain of the invention may be any chain or a member similar to a chain for transmitting power by engaging the cylindrical members provided at equal intervals with the drive roller and meshes with the teeth of the sprocket such as the drive roller chain and the chain.

Also, when the chain transmission mechanism is used in an application such as a chain conveyor in which only traveling and driving force of the chain is required, it is possible to provide only the driving sprocket which determines the path of the segment of the chain which passes around the sprocket. The path of the remaining segments of the chain may be determined by the use of one or more guide rails.

The shape of the tooth may be formed into any shape as long as it alleviates the impact and impact noise caused by the contact when the chain engages with the sprocket. The teeth may have a tooth surface which smoothly changes, such as an involute tooth.

The invention claimed is:

1. A chain transmission mechanism, comprising:
a chain having pluralities of link plates alternately linked by pins;
said chain having guide rollers rotatably supported coaxially with said pins;
at least a first sprocket having a plurality of teeth engaging between two adjoining pins, and tooth spaces between said teeth receiving said pins;
guide rails provided with arcuate tracks alongside the teeth of said sprocket to contact said guide rollers and determine a track of said chain; and
tooth bottoms at the bottom of said tooth spaces, said bottoms being formed into a shape not contacting with the pins of said chain when said chain is wound around the sprocket along the track along said guide rail;
wherein the plurality of teeth of said sprocket have a pitch circle which has a smaller diameter than the pitch circle of the pins of said chain as they travel in the arcuate tracks of said chain.

2. The chain transmission mechanism according to claim 1, including a second sprocket spaced from said first sprocket to provide a tension section of said chain between said sprockets, wherein said guide rails include an extension determining the track of said tension section of the chain.

3. The chain transmission mechanism according to claim 1, wherein the arcuate tracks of the chain defines a pitch circle of said chain, and the arcuate tracks of the guide rail defines a pitch circle of said guide rail, said guide rail pitch circle having a diameter larger than the diameter of the pitch circle of the chain which would exist if said chain engaged with the sprocket without having said guide rail; and
the center of the pitch circle of said chain when said chain travels along said guide rail is spaced from the center of the pitch circle of the chain if the chain would engage with the sprocket without having the guide rail.

4. The chain transmission mechanism according to claim 1, wherein said chain has two link plate rows each composed of inner and outer link plates;
said pins including drive rollers or bushes located between the inner link plates of said two link plate rows and engaging with the tooth spaces of the sprocket; and
said guide rollers being outside of said outer link plates.

5. The chain transmission mechanism according to claim 1, wherein said chain has four link plate rows each composed of inner and outer link plates;
said pins including drive rollers located between the inner link plates of said two link plate rows and engaging with the tooth spaces of the sprocket, and
said guide rollers being located between the outer link plates of the two center link plate rows of said four link plate rows, and the inner link plates of the two outer link plate rows of said four link plate rows.

6. The chain transmission mechanism according to claim 1, wherein said chain has two link plate rows each composed of inner and outer link plates;
said guide roller being located between the inner link plates of said two link plate rows;
said pins including drive rollers located outside of said two link plate rows, respectively; and
said sprocket having two rows of teeth, said rows being spaced apart in the width direction at a distance corresponding to the length of said guide roller.

7. The chain transmission mechanism according to claim 1, wherein said chain has a tension run on one side of said sprocket and a return run on the other side of said sprocket, said guide rails have an extension underlying said return run of said chain.

8. The chain transmission mechanism according to claim 1 comprising bushes rotatably mounted on the pins wherein the tooth spaces receive the pins and bushes and wherein the tooth bottoms do not contact the pins and bushes.

9. The chain transmission mechanism according to claim 1 comprising drive rollers rotatably mounted on the pins wherein the tooth spaces receive the pins and drive rollers and wherein the tooth bottoms do not contact the pins and drive rollers.

10. The mechanism of claim 1 wherein the chain has four link plate rows each composed of inner and outer link plates;
wherein, the pins include drive rollers located between the inner link plates of the two link plate rows and engaging with the tooth spaces of the sprocket, and
wherein the guide rollers are located between the outer link plates of the two center link plate rows of the four link plate rows, and the inner link plates of the two outer link plate rows of the four link plate rows.

11. The mechanism of claim 1 wherein the chain has two link plate rows each composed of inner and outer link plates;
wherein the guide rollers are located between the inner link plates of the two link plate rows;
wherein the pins include drive rollers located outside of the two link plate rows, respectively; and
the first sprocket having two rows of teeth spaced apart in the width direction at a distance corresponding to the length of the guide roller.

12. A chain transmission mechanism, comprising:
a chain comprising:
a plurality of link plates;
a plurality of connectors connecting the link plates, wherein each connector has an outer surface;
a plurality of rotatable guide elements connected with the connectors;
a first sprocket comprising:
a plurality of teeth;
tooth spaces between the teeth, wherein the bottom of each tooth space is a tooth bottom;
wherein the teeth engage the chain between two adjoining connectors and the tooth spaces receive the connectors;
guide rails comprising arcuate tracks alongside the teeth of the sprocket, wherein the guide elements contact the guide rails so that the guide rails guide the path of the chain; and
wherein the guide rails guide the guide elements to maintain a gap between the outer surfaces of the connectors and the tooth bottoms as the chain is driven around the sprocket,
wherein the plurality of teeth of the first sprocket have a pitch that is shorter than the pitch of the pins of the chain as the pins travel in the arcuate track of the chain.

13. The mechanism of claim 12 wherein the guide elements comprises guide rollers coaxially mounted on the connectors.

14. The mechanism of claim 12 wherein the connectors comprise pins.

15. The mechanism of claim 14 wherein the connectors comprise bushes or drive rollers coaxially mounted on the pins.

16. The mechanism of claim 15 wherein the chain comprises two link plate rows each composed of inner and outer link plates, wherein the bushes or drive rollers are located between the inner link plates of the two link plate rows so that the bushes or drive rollers engage the tooth spaces of the sprocket.

17. The mechanism of claim 16 wherein the guide elements are outside of the outer link plates of the two link plate rows.

18. The mechanism of claim 12 wherein the arcuate track of the chain defines a pitch circle of the chain, and the arcuate track of the guide rail defines a pitch circle of the guide rail, wherein the guide rail pitch circle has a diameter larger than the pitch circle of the chain that would exist if the chain engaged the sprocket without having the guide rail.

19. The mechanism of claim 18 wherein the center of the pitch circle of the chain when the chain travels along the guide rail is spaced from the center of the pitch circle the chain would have if the chain engaged the sprocket without having the guide rail.

* * * * *